Jan. 30, 1923.
1,443,666
J. C. WILLIAMSON ET AL.
CABLE TAKE-UP.
FILED MAR. 15, 1921.
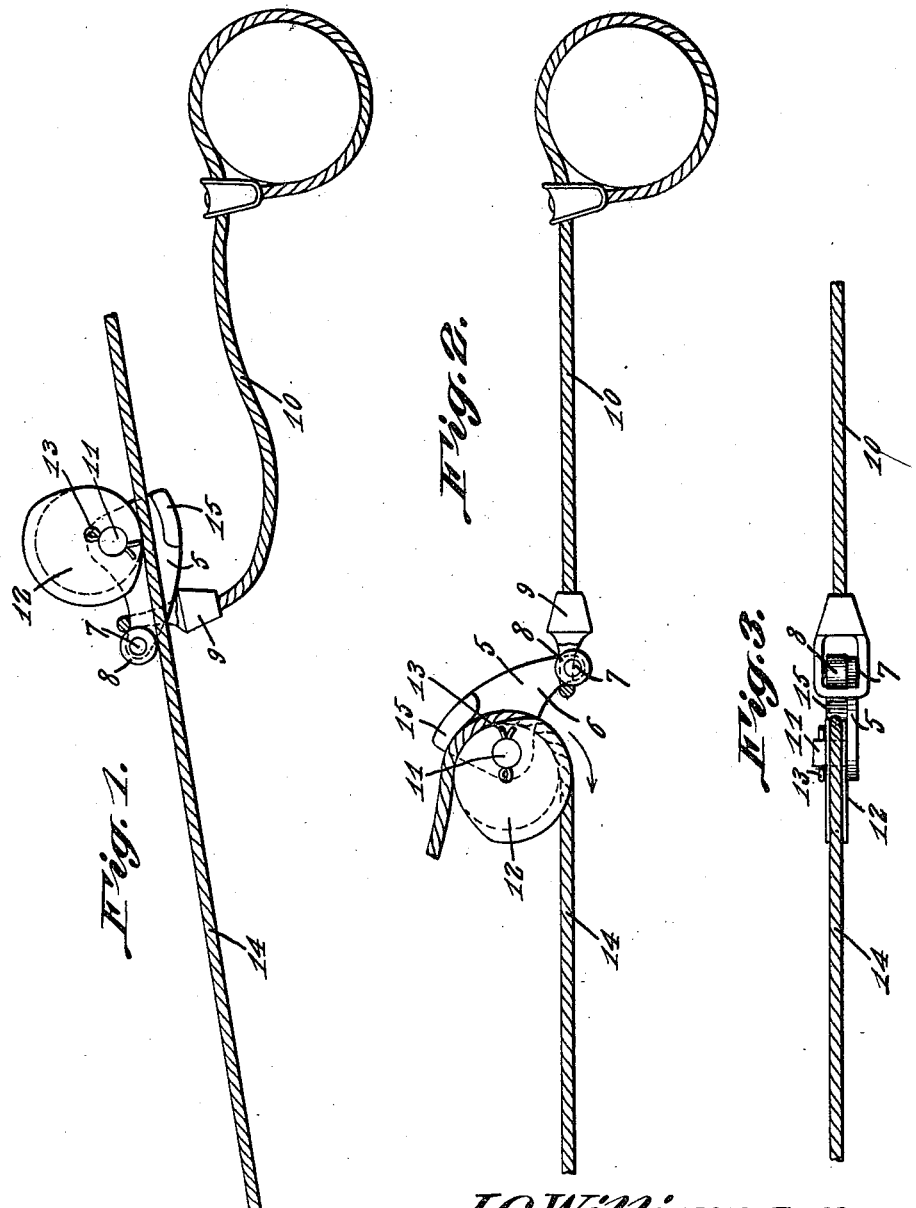
J.C.Williamson, Inventor
F.D.Williamson,
By C.A.Snow & Co.
Attorney Patented Jan. 30, 1923.

1,443,666

UNITED STATES PATENT OFFICE.

JAMES C. WILLIAMSON AND FELIX D. WILLIAMSON, OF CORDELE, GEORGIA.

CABLE TAKE-UP.

Application filed March 15, 1921. Serial No. 452,417.

*To all whom it may concern:*

Be it known that we, JAMES C. WILLIAMSON and FELIX D. WILLIAMSON, citizens of the United States, residing at Cordele, in the county of Crisp, State of Georgia, have invented a new and useful Cable Take-Up, of which the following is a specification.

This invention relates to self tying take-ups, and more particularly to a takeup of the quick acting type, it being the primary object of the invention to provide a takeup which may be readily and easily applied to a cable, and one which will lock by frictional contact therewith, it being unnecessary to coil the cable around the takeup to accomplish the locking thereof.

A further object of the invention is the provision of a takeup which will not bite the cable associated with the same to injure the cable or render it inoperative.

A still further object of the invention is to provide a movable jaw which will increase its grip on the cable as the tension on the cable increases incident to the use of the cable as a stump extractor element.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of the takeup showing the same as applied to a cable.

Figure 2 is a side elevational view showing the takeup in a gripping position.

Figure 3 is a bottom plan view of the cable in its gripping position.

Referring to the drawing in detail, the reference character 5 designates the body portion of the takeup, which is provided with an extension 6 providing an arm, which extension has a laterally extending pin 7 forming a bearing for the roller 8, the periphery of the roller forming an offset portion with respect to the arm 6 to eliminate any possibility of the eye 9, carried by the cable 10 from slipping from the extension during the operation of the device.

Extending laterally from the body portion 5 is a shaft 11 which provides a bearing for the cam 12, there being provided a pin 13 for securing the cam to its shaft.

This cam 12 is provided with a peripheral groove to accommodate the cable 14, which in the present showing represents the power cable of a stump pulling machine and as shown more clearly by Figure 2 of the drawings, the cam cooperates with a laterally extending jaw 15 which is spaced from the cam and overlies the periphery of the same so that when the body portion 5 is locked, and tension is exerted on the cable 14 to rotate the cam 12 in the direction of the arrow as shown by Figure 2, the jaw 15 will be caused to frictionally engage the cable 14 and force the same into close engagement with the cam, it being understood that the action of the cam also forces the cable into engagement with the jaw 15, thereby providing a quick acting takeup, and one which will increase the gripping action upon increased tension on the cable 14.

In the operation of the device, the cable 10 which constitutes the stump cable of the machine, has a portion thereof looped around the stump to be pulled, while the eye 9 thereof is positioned over the extension 6.

The operator now takes up the slack in the cable 10 as by placing his foot thereon, which action causes the jaw 15 to engage the cable 14, the cam 12 being also moved into clamping relation with the jaw, creating sufficient friction to cause the cam 12 and body 5 to take positions as shown by Figure 2 of the drawing.

The cable 14 is now gripped between the jaw 15 and cam 12, and its follows that when power is applied to the cable 14, by a suitable power device not shown, the cable 14 is held against movement with respect to the takeup.

If it is desired to release the takeup it is only necessary to force the eye 9 from the arm 6, by taping the same with a hammer, whereupon the eye 9 moves over the roller 8 and releases its hold on the arm 6.

Having thus described the invention, what is claimed as new is:—

A takeup comprising a body portion formed with an integral flange providing a jaw, a cam supported by the body portion and adapted to cooperate with the jaw to clamp a cable, and a roller supported at one end of the body portion, said roller adapted to cooperate with an eye member to secure the eye member to the body portion.

In testimony that we claim the foregoing as our own, we have hereto affixed our signatures in the presence of two witnesses.

JAMES C. WILLIAMSON.
FELIX D. WILLIAMSON.

Witnesses:
W. G. FLEMING,
L. E. HUFFMAN.